USO10494196B2

(12) United States Patent
Fenile

(10) Patent No.: US 10,494,196 B2
(45) Date of Patent: Dec. 3, 2019

(54) METHOD FOR OPENING A TRANSPORT POCKET SUSPENDED ON A CARRIAGE AS WELL AS A POCKET OPENING DEVICE FOR PERFORMING THE METHOD

(71) Applicant: FERAG AG, Hinwil (CH)

(72) Inventor: Roberto Fenile, Wetzikon (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 16/438,123

(22) Filed: Jun. 11, 2019

(65) Prior Publication Data

US 2019/0300294 A1    Oct. 3, 2019

Related U.S. Application Data

(63) Continuation of application No. 15/692,605, filed on Aug. 31, 2017, now Pat. No. 10,322,887.

(30) Foreign Application Priority Data

Sep. 9, 2016 (CH) ........................... 1171/16

(51) Int. Cl.
*B65G 47/78* (2006.01)
*B65G 47/36* (2006.01)
(Continued)

(52) U.S. Cl.
CPC ............ *B65G 47/78* (2013.01); *B65G 9/004* (2013.01); *B65G 47/36* (2013.01); *B65G 19/025* (2013.01);
(Continued)

(58) Field of Classification Search
CPC ................ B65G 9/004; B65G 47/61
See application file for complete search history.

(56) References Cited

U.S. PATENT DOCUMENTS

| 3,338,179 A | 8/1967 | Klemm |
| 3,533,499 A | 10/1970 | Harkess |

(Continued)

FOREIGN PATENT DOCUMENTS

| CH | 00089/15 | 1/2015 |
| DE | 12 33 777 B | 2/1967 |

(Continued)

OTHER PUBLICATIONS

SDIGroupLtd., "SDI Group's MonaLisa Pouch Sortation system," https://www.youtube.com/watch?v=Srj3Tq1IVis, uploaded Jan. 29, 2014 (4 pages).

(Continued)

*Primary Examiner* — Gene O Crawford
*Assistant Examiner* — Lester Ill Rushin
(74) *Attorney, Agent, or Firm* — Pauley Erickson & Kottis

(57) ABSTRACT

In a method for opening a transport pocket (15), which is moved in a conveying direction (BR) along a running rail (11) extending in the conveying direction (BR) for the conveying of goods suspended on a carriage (12), simple and precise loading and/or unloading of the transport pocket (15) is enabled by the fact that the carriage (12) with the transport pocket (15) suspended thereon is stopped in its forward movement at a predetermined point of the running rail (11) in order to open the transport pocket (15), and that the transport pocket (15) of the carriage (12) is opened for loading and/or unloading of conveyed goods to be transported.

24 Claims, 5 Drawing Sheets

(51) Int. Cl.
*B65G 9/00* (2006.01)
*B65G 19/02* (2006.01)
*B65G 47/61* (2006.01)

(52) U.S. Cl.
CPC ........ *B65G 47/61* (2013.01); *B65H 2301/432* (2013.01)

(56) References Cited

U.S. PATENT DOCUMENTS

| | | |
|---|---|---|
| 3,663,052 A | 5/1972 | Schurch |
| 3,807,314 A | 4/1974 | Slemmons |
| 4,104,156 A | 8/1978 | Fletcher |
| 4,140,163 A | 2/1979 | Usner |
| 4,727,979 A | 3/1988 | Wolfson et al. |
| 4,878,577 A | 11/1989 | Romero Liedo et al. |
| 4,922,829 A | 5/1990 | Kuchta et al. |
| 4,925,015 A | 5/1990 | Vaida et al. |
| 4,946,023 A | 8/1990 | Heinold et al. |
| 5,142,993 A | 9/1992 | Robu et al. |
| 5,216,949 A | 6/1993 | Bertozzi |
| 5,697,508 A | 12/1997 | Rifkin et al. |
| 6,742,648 B2 | 6/2004 | Honegger |
| 8,607,963 B2 | 12/2013 | Wend |
| 8,672,118 B2 | 3/2014 | Janzen et al. |
| 9,187,252 B2 | 11/2015 | Wend |
| 9,630,751 B1 | 4/2017 | Otto |
| 9,828,182 B2 | 11/2017 | Schoenenberger |
| 10,005,616 B2 | 1/2018 | Fenile et al. |
| 10,040,641 B2 | 8/2018 | Fenile et al. |
| 10,065,800 B2 | 9/2018 | Auf Der Maur |
| 10,301,114 B2 | 5/2019 | Fenile |
| 2004/0089623 A1 | 5/2004 | Harrell |
| 2007/0029164 A1 | 2/2007 | Bree |
| 2012/0037272 A1 | 2/2012 | Wend et al. |
| 2012/0216917 A1 | 8/2012 | Janzen |
| 2014/0284179 A1 | 9/2014 | Janzen |
| 2014/0291123 A1 | 10/2014 | Olivieri et al. |
| 2015/0225177 A1 | 8/2015 | Schoneberger |
| 2016/0046446 A1 | 2/2016 | Matsuoka |
| 2016/0159558 A1 | 6/2016 | Schneuing |
| 2017/0015505 A1 | 1/2017 | Schoenenberger |
| 2017/0088302 A1 | 3/2017 | Auf Der Maur |
| 2018/0072511 A1 | 3/2018 | Fenile |
| 2018/0305131 A1 | 10/2018 | Fenile et al. |

FOREIGN PATENT DOCUMENTS

| | | |
|---|---|---|
| DE | 2 221 318 | 11/1973 |
| DE | 81 33 433 U1 | 3/1982 |
| DE | 38 40 521 A1 | 6/1990 |
| DE | 40 42 375 A1 | 12/1991 |
| DE | 689 07 399 T2 | 10/1993 |
| DE | 692 01 185 T2 | 5/1995 |
| DE | 297 09 547 U1 | 9/1997 |
| DE | 196 14 905 A1 | 11/1997 |
| DE | 103 09 127 A1 | 9/2004 |
| DE | 10 2004 018 569 A1 | 11/2005 |
| DE | 10 2008 026 720 A1 | 12/2009 |
| DE | 10 2008 061 685 A1 | 6/2010 |
| DE | 10 2010 033 905 A1 | 2/2012 |
| DE | 10 2010 053 590 A1 | 6/2012 |
| DE | 10 2011 015 138 A1 | 9/2012 |
| DE | 10 2011 101 987 A1 | 11/2012 |
| DE | 10 2012 018 925 A1 | 3/2014 |
| DE | 10 2012 108 757 A1 | 3/2014 |
| DE | 10 2013 205 172 A1 | 9/2014 |
| DE | 10 2014 203 298 A1 | 8/2015 |
| EP | 1 420 105 A1 | 5/2004 |
| EP | 1 420 106 A1 | 5/2004 |
| EP | 2 130 968 A1 | 12/2009 |
| EP | 2 196 415 A2 | 6/2010 |
| EP | 2 418 160 A1 | 2/2012 |
| EP | 2 620 394 A1 | 7/2013 |
| EP | 2 786 940 A1 | 10/2014 |
| EP | 2 708 478 B1 | 11/2014 |
| GB | 733714 A | 7/1955 |
| JP | 3060257 B2 | 7/2000 |
| WO | WO 2012/156451 A1 | 11/2012 |
| WO | WO 2015/124525 A1 | 8/2015 |
| WO | WO 2016/030275 A1 | 3/2016 |
| WO | WO 2016/8030274 A1 | 3/2016 |
| WO | WO 2016/120031 A1 | 8/2016 |
| WO | WO 2016/120032 A1 | 8/2016 |

OTHER PUBLICATIONS

OLYMP, "Das OLYMP Logistik-Zentrum (OLZ)," https://www.youtube.com/watch?v=CWv9zVDIz Y, uploaded Oct. 21, 2013 (6 pages).
Schoneberger-Systeme GmbH, "eCommerce Losung von Schonenberger Systeme," https://www.youtube.com/watch?v=8DIfUnIHT9k, uploaded Nov. 9, 2016 (7 pages).
European Patent Office, Communication, EPO Form 1507N, dated Jan. 23, 2018 (1 page).
European Patent Office, Supplementary European Search Report, EPO Form 1503 03.82, dated Jan. 15, 2018 (1 page).
European Patent Office, Annex to the European Search Report on European Patent Application No. EP 17 18 9731, EPO Form P0461, dated Jan. 15, 2018 (2 pages).
European Patent Office, EPO Form P04A44, Jan. 15, 2018 (1 page).
European Patent Office, European Search Opinion, EPO Form 1703 01.91TRI, dated Jan. 15, 2018 (4 pages).

METHOD FOR OPENING A TRANSPORT POCKET SUSPENDED ON A CARRIAGE AS WELL AS A POCKET OPENING DEVICE FOR PERFORMING THE METHOD

CROSS-REFERENCE TO RELATED APPLICATIONS

This application is a continuation of U.S. patent application Ser. No. 15/692,605, filed on 31 Aug. 2017, issuing on 18 Jun. 2019 as U.S. Patent 10,322,887 which claims a foreign priority benefit of Swiss Patent Application 01171/16, filed 9 Sep. 2016, its the priority document corresponding to the invention and is claimed under Title 35, United States Code, Section 119. The parent application and related application are hereby incorporated by reference herein in their entirety and are made a part hereof, including but not limited to those portions which specifically appear hereinafter.

BACKGROUND OF THE INVENTION

Field of the Invention

The present invention relates to the area of conveying technology. It relates to a method for opening a transport pocket suspended on a carriage. It also relates to a pocket opening device for performing the method.

Discussion of Related Art

A multiplicity of transport or conveying systems based on the use of suspended transport pockets to be opened for loading and unloading the conveyed goods are known from the prior art.

Publication EP 2 130 968 B1 relates to a transport pocket and a conveyor system for a transport pocket. The transport pocket comprises an at least dimensionally stable carrying wall, which in its lower region is provided with at least one coupling and which in its upper region is provided with means for releasing the coupling. The bottom-side wall is constituted flexible in its lower region and comprises counter-coupling means which can be engaged with the coupling, so that the transport pocket can be closed at the bottom. When the coupling is opened, the transport pocket opens downwards and discharges the transported goods.

The associated conveyer system has a conveying rail with drivers movable in the conveying direction for receiving in each case a carrying hook, a closing station for coupling the counter-coupling means of the flexible bottom-side wall with the at least one coupling of the carrying wall, a loading station with means for raising the mounting bracket in order to distance the bottom-side wall from the carrying wall against the conveying direction and an unloading station with means for releasing the means for opening the coupling.

Publication DE 10 2012 108 757 A1 relates to a carrying pocket for an overhead conveyor system for the suspended transport of objects and a closing mechanism for closing a carrying pocket for an overhead conveyor system. It discloses a carrying pocket for the overhead conveyor system for the suspended transport of objects, comprising a holding frame, a pocket bag, which hangs on the holding frame and in which objects to be transported can be accommodated, and a suspension element, which is connected to the holding frame and by means of which the carrying pocket can be suspended on an overhead conveyor system in order to be transported in a suspended manner by the overhead conveyor system, wherein the pocket bag comprises a first and a second bag section, e.g. materially separate from one another, which each comprise a bag end section connected to the holding frame and a second bag end section facing away from the holding frame, wherein the second bag end sections are connected to one another by a linkage mechanism, which can be brought into an unloading position (by swiveling about a swiveling axis), in which the second bag end sections are arranged at a distance from one another, so that the pocket bag is provided with an outlet opening formed between the two bag end sections for the discharging of objects, e.g. for discharging vertically downwards, and which can be brought into a loading position (by swiveling about a swiveling axis), in which the second bag end sections are arranged adjacent to one another, so that the outlet opening is closed and the pocket bag can receive objects, i.e. can hold the latter therein/in its interior.

Publication DE 10 2008 061 685 A1 relates to a loading station for transport pockets transported in an overhead conveyor system. The loading station comprises an upper feed rail for the transport pockets, a vertical conveyor adjoining the feed rail for feeding the transport pockets into a lower loading position, a device for opening the transport pockets in the loading position and a lower discharge rail adjoining the vertical conveyor for discharging the transport pockets out of the loading station. The pocket is opened here by a sliding-link guide during the movement into the loading position.

Publication DE 10 2004 018 569 A1 relates to a collecting device for the collection of objects for the purpose of sorting, in particular items of clothing, and a conveying system for the transport of the collecting device. The collecting device is characterized by a collecting pocket, which essentially comprises a rack provided with a driver integrated into the conveying system and a pocket bag suspended on the rack, wherein the driver and the rack can be swiveled relative to one another about an axis lying normal to the conveying direction, and wherein the pocket bag is opened when the rack is in a horizontal arrangement and the pocket bag is folded together and essentially closed when the rack is in a vertical arrangement.

Publication DE 10 2013 205 172 A1 discloses a transport pocket for the suspended transport of goods. The transport pocket has a stiff carrying wall, which, in the transport position, includes an upper section connected to a carrying element for the suspended carrying of the transport pocket. A flexible goods-retaining wall forms, together with the carrying wall, a carrying pocket closed at the bottom and at the opposite sides at least in the transport position of the transport pocket. The carrying wall is connected to the retaining wall, in the transport portion, between an upper wall-connecting portion and a lower wall-connecting portion, in such a way that a length of the web-like retaining wall between the two wall-connecting portions is adapted variably to the transport of different goods. The embodiment of the transport pocket is such that this length adaptation of the retaining wall takes place by a relative displacement of the retaining wall with respect to the carrying wall at least in the region of one of the two connecting portions.

Publication DE 10 2010 033 905 A1 relates to a conveying system with carrying pockets for conveyed goods. The conveying system comprises a fixed conveyor rail with drivers moved in the conveying direction for receiving in each case a suspension point of the carrying pockets, the carrying pocket with a pocket bag for receiving the conveyed goods, wherein the pocket bag comprises wide and narrow side walls with dimensions a, b arranged in a rectangular shape, the pocket bag with a carrying frame, which comprises a tension rod with the suspension point constituted at the upper end, and which encompasses a loading window for the pocket bag, the carrying frame with a pressure piece extending parallel to the wide side walls, a coupling located between the driver and the carrying frame for adjusting a stable rotary position of the carrying pocket relative to the driver, in which position the carrying pocket occupies a position with a location of the loading window normal to the conveying direction, and for adjusting a non-stable rotary position of the carrying pocket relative to the driver, in which the carrying pocket occupies a position with the loading window parallel to the conveying direction, wherein the non-stable rotary position can be adjusted by the pressure piece engaging with a fixed skid against the resistance of a restoring torque.

Publication DE 10 2014 203 298 A1 relates to an overhead conveyor system for transporting conveyed goods in hanging pockets. The overhead conveyor system comprises a plurality of hanging pockets, in each case with a first pocket side wall and a second pocket side wall, which are connected to each other in a folding connection region in such a way that they can be unfolded and folded together for the opening and closing of a receiving region for conveyed goods, and with a suspension means for suspending the hanging pocket on the overhead conveyor system, wherein the first pocket side wall is connected to the suspension means in a swiveling manner about a pocket swiveling axis running at least approximately horizontally in a transport position of the hanging pocket, and the second pocket side wall is connected to the suspension means or can be acted upon by the latter in such a way that the pocket side walls can be folded open and folded together by swiveling the first pocket side wall about the pocket swiveling axis, wherein the overhead conveyor system also comprises a guide rail arrangement for the guided movement of the hanging pockets in their transport position and a loading station for the hanging pockets, with a loading platform which is positioned beneath the guide rail arrangement. The loading platform is adjustable in the vertical direction relative to the guide rail arrangement, preferably automatically traversable.

Publication WO 2015/124525 A1 relates to a hanging pocket as a conveyed goods container for the transport of conveyed goods in an overhead conveyor system. The hanging pocket comprises a first pocket side wall and a second pocket side wall, which lying opposite one another delimit a conveyed goods receiving region between them and are connected to one another in a folding connection region in such a way that they can be folded open and folded together for the opening and closing of the conveyed goods receiving region, and a suspension means for suspending the hanging pocket on a guide rail arrangement of an overhead conveyor system, wherein the first pocket side wall comprises a stiff edge contour region and is connected to the suspension means capable of a swiveling movement on the latter about a swiveling axis and wherein the second pocket side wall is connected to the suspension means or acted upon by the latter in such a way that, by swiveling the first pocket side wall about the swiveling axis, the first and the second pocket side wall can be folded open and folded together. The hanging pocket comprises a base assembly and an exchange element, wherein the base assembly comprises the suspension means and the stiff edge contour region, and wherein the exchange element comprises at least one part of the second pocket side wall, preferably the entire second pocket side wall, and is provided in an exchangeable manner on the base assembly.

Publication DE 10 2011 015 138 B4 discloses an overhead conveyor transport pocket for the automatic unloading of loaded piece goods with a base body and a separate receiving section adjoining the latter, wherein the base body comprises an upper side, a lower side, lateral sides and front sides, wherein the receiving section comprises a bottom, an upper side, front sides and lateral sides, wherein the unloading of the transport pocket takes place through one of the front sides of the base body, which is constituted open, wherein an opposite-lying front side is preferably also constituted open, wherein the lower side of the base body couples with the upper side of the receiving section in order to define a receiving space beneath the base body, and wherein the lower side of the base body, in particular in an unloaded state of the transport pocket, is constituted open, wherein the upper side of the receiving section is constituted open in the unloaded state of the transport pocket, wherein at least the lateral sides of the base body, the lateral sides of the receiving section and the bottom of the receiving section are constituted closed and wherein at least the lateral sides of the receiving section are constituted flexible in such a way that the bottom can be raised into an unloading position of the transport pocket, in which the bottom is raised into the underside of the base body. The transport pocket comprises in each case a retention device in the region of the front sides, which extends at least along a transfer line between the base body and the receiving section.

Publication DE 10 2012 018 925 A1 discloses a pocket overhead conveyor system with an overhead conveyor for transporting pockets along a guide rail downwards in a conveying direction, wherein the pockets in a transport position hang vertically beneath the guide rail and wherein the pockets in a loaded position are orientated essentially horizontal, with a loading station, which comprises a deflection device, wherein the deflection device comprises an end located upstream and an end located downstream and is arranged beneath the guide rail of the overhead conveyor, wherein the pockets come into contact with the deflection device during the transport in the conveying direction, in order to rotate the pockets at least initially during a continued transport in the conveying direction out of the vertical transport position into the essentially horizontal loading position, and with a pocket, wherein the pocket comprises a suspension device for the swivelable coupling of the pocket with the guide rail of the overhead conveyor, a rear side which in the vertical transport position comprises an upper section and a lower section, wherein the lower section adjoins the upper section in a longitudinal direction of the rear side, a top, a front side and a bottom, wherein the rear side in the transverse direction is constituted respectively wider than the top, the front side and the bottom, so that the rear side comprises at least one wing region projecting laterally with respect to the front side, which wing region strikes against the at least one swiveling element during the transport of the pocket through the loading station in order to rotate the pocket and which in the loading position lies on the deflection device.

All these known methods and systems have in common the fact that they are loaded and/or unloaded during the ongoing transport, for which reason the respective pockets are opened and the conveyed goods are loaded or unloaded during the ongoing transport movement. A drawback is that such plain "simultaneous" loading and/or unloading of the pockets requires an increased process-related and equipment outlay, which in particular is caused by the required synchronization of the various movements.

BRIEF SUMMARY OF THE INVENTION

It is therefore the object of the invention to specify a method for opening transport pockets in a conveyor system based on transport pockets, and to create a pocket opening device for performing the method, which avoid the drawbacks of known methods and devices, are designed and constructed in a more simple manner and are characterized by a procedure or operation less susceptible to malfunction.

The method according to the invention for opening a transport pocket, which is moved in a conveying direction along a running rail extending in the conveying direction for the conveying of goods suspended on a carriage, is characterized in that the carriage with the transport pocket suspended thereon is stopped in its forward movement at a predetermined point of the running rail in order to open the transport pocket, and that the transport pocket of the carriage is opened for loading and/or unloading of conveyed goods to be transported.

Unlike the known methods, wherein the pocket is opened, loaded or unloaded and closed again during an undamped continued transport, the transport pockets to be opened are individually stopped and opened in the method according to the invention.

The transport pocket of the carriage can be opened for loading and/or unloading of conveyed goods to be transported only when the carriage is already in its rest position.

The transport pocket of the carriage can also comprise a swiveling frame at the upper end, said swiveling frame being swiveled for the opening or closing of the transport pocket.

According to an embodiment of the method according to the invention, the arrival of the carriage in its rest position is detected by means of a carriage detector, and the carriage detector actuates an opening mechanism when it detects a carriage in the rest position.

In particular, the transport pocket can comprise a material web fixed to the swiveling frame with both ends thereby forming a carrying loop hanging downwards, wherein the two ends of the carrying loop are arranged one behind the other in the conveying direction, wherein the swiveling frame on the carriage can be swiveled about a first swiveling axis orientated transverse to the conveying direction between a first position, in which the transport pocket is closed, and a second position, in which the transport pocket is open, and wherein the swiveling frame on the carriage is swiveled by an opening mechanism from the first into the second position and held in the second position for loading and/or unloading of conveyed goods to be transported.

The transport pocket is delimited to the exterior essentially by the two vertical sections of the material web, which form two pocket walls. The transport pocket is open when the two pocket walls have a sufficient distance from one another to introduce conveyed goods into the intermediate space or to remove the latter therefrom. The transport pocket is closed when the pocket walls have been moved so far towards one another that filling with or removal of conveyed goods is virtually no longer possible.

In particular, the opening mechanism can comprise a movable element for opening the transport pocket.

The loading and unloading of the conveyed goods to be transported can take place transverse to the conveying direction through lateral openings of the transport pocket. It is however also conceivable for the loading and unloading of the transport pocket to be carried out from above.

After the loading and/or unloading, the carriage with the transport pocket suspended thereon can be released at the predetermined point of the running rail, and the swiveling frame swivels after the release about the first swiveling axis from the second position back into the first position.

In particular, the swiveling-back of the swiveling frame can take place automatically by means of gravity.

The transport pocket suspended on the carriage can, after release, move with its swiveling frame located in the second position past the opening mechanism, wherein the swiveling frame swivels back from the second position into the first position only after passing the opening mechanism.

After the release, a movement impulse in the conveying direction can also be imparted to the carriage with the transport pocket suspended thereon.

In particular, the movement impulse can be imparted by means of a stationary, swivelable conveying lever, which briefly engages with the carriage.

The pocket opening device according to the invention is characterized by a first device for stopping a carriage, said first device being arranged in the region of the running rail and at least one opening mechanism for opening a transport pocket suspended on a stopped carriage, said opening mechanism being arranged in the region of the running rail.

According to an embodiment of the invention, the first device and the opening mechanism are connected to one another by control technology.

Another embodiment is characterized in that the first device and the opening mechanism are arranged at the side of the running rail.

In particular, the first device and the opening mechanism can be arranged on opposite sides of the running rail. It is however also conceivable for both devices to be arranged on the same side of the running rail if sufficient space is available for this.

A pair of opening mechanisms of similar type can be arranged on opposite sides of the running rail in a mirror-symmetrical manner. Such a paired opening mechanism comes into consideration especially when the swiveling frame of the transport pocket can only be swiveled with difficulty for reasons of size, weight or the filling of the pocket.

A further embodiment of the invention is characterized in that the first device comprises a mobile stopping element, which in a first position stops an approaching carriage at the predetermined point of the running rail and in a second position releases a carriage stopped there.

In particular, the mobile stopping element can be mounted in a swiveling manner about a first swiveling axis orientated transverse to the conveying direction and can be swiveled about the first swiveling axis between the first position and the second position.

A conveying lever capable of being swiveled together with the stopping element about the first swiveling axis can also be assigned to the mobile stopping element, which conveying lever, upon release of a stopped carriage by the stopping element, simultaneously imparts to the carriage a movement impulse in the conveying direction.

A further embodiment of the invention is characterized in that a carriage detector is arranged inside the first device at the predetermined point of the running rail, said carriage detector detecting a stopped carriage, and that the carriage detector is connected to the opening mechanism by control technology.

Another embodiment of the invention is characterized in that the transport pocket comprises a material web fastened to a swiveling frame at both ends thereby forming a carrying loop hanging downwards and forming a front wall and a rear wall, wherein the two ends of the carrying loop are arranged one behind the other in the conveying direction, that the swiveling frame on the carriage can be swiveled about a second swiveling axis orientated transverse to the conveying direction between a first position, in which the transport pocket is closed, and a second position, in which the transport pocket is open, and that the opening mechanism comprises a swiveling lever which can be swiveled about a third swiveling axis orientated transverse to the conveying direction, which swiveling lever is arranged at the edge of the movement path of the swiveling frame of a conveyed transport pocket and is provided at its free end with a catch, which can be engaged with the swiveling frame in order to swivel the swiveling frame on the carriage from the first into the second position and hold the latter in the second position for the loading and/or unloading of the conveyed goods to be transported.

In particular, the swiveling lever can be swiveled between a rest position and an opening position, wherein the catch on the swiveling lever of the opening mechanism in the rest position is located in front of the swiveling frame of a stopped transport pocket, and in the opening position occupies a position between the front wall and rear wall of the transport pocket.

The swiveling range of the swiveling lever can also extend beneath the third swiveling axis and can amount for example to 90° or 180° between the rest position and the opening position.

Furthermore, it is possible and conceivable to use, instead of a swiveling lever, another, in particular linear actuator, for example a linearly movable piston rod, in order to swivel the swiveling frame. An opening screw can also be used for swiveling the swiveling frame, said opening screw being advanced from the side towards the swiveling frame and swiveling it into the opening position while sliding on the increasingly large radius of the screw. It is also conceivable to provide an automatically operating gripper, which grips the swiveling frame outside the swiveling axis and swivels it into the opening position.

BRIEF DESCRIPTION OF SEVERAL VIEWS OF THE DRAWINGS

The invention is to be explained in greater detail below with the aid of examples of embodiment in connection with the drawing. In the figures.

DETAILED DESCRIPTION OF THE INVENTION

Figure 1:
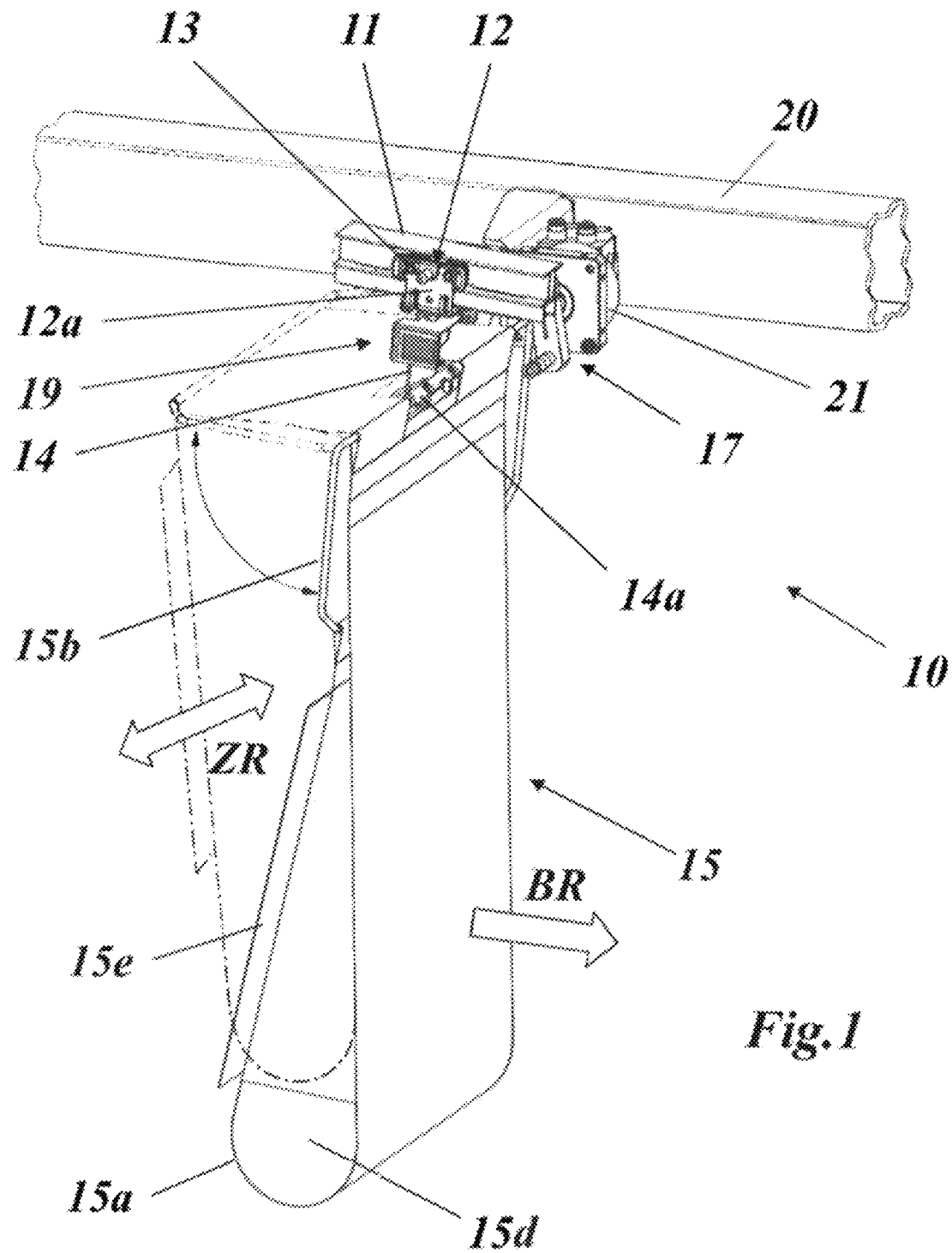
FIG. 1 shows in a perspective side view an embodiment of the pocket opening device according to the invention, wherein only the transport pocket and the actual opening mechanism engaging with the transport pocket are shown.

An embodiment of the pocket opening device according to the invention is reproduced in a perspective side view in FIG. 1, wherein only the transport pocket and the actual opening mechanism engaging with the transport pocket are shown.

Figure 2:
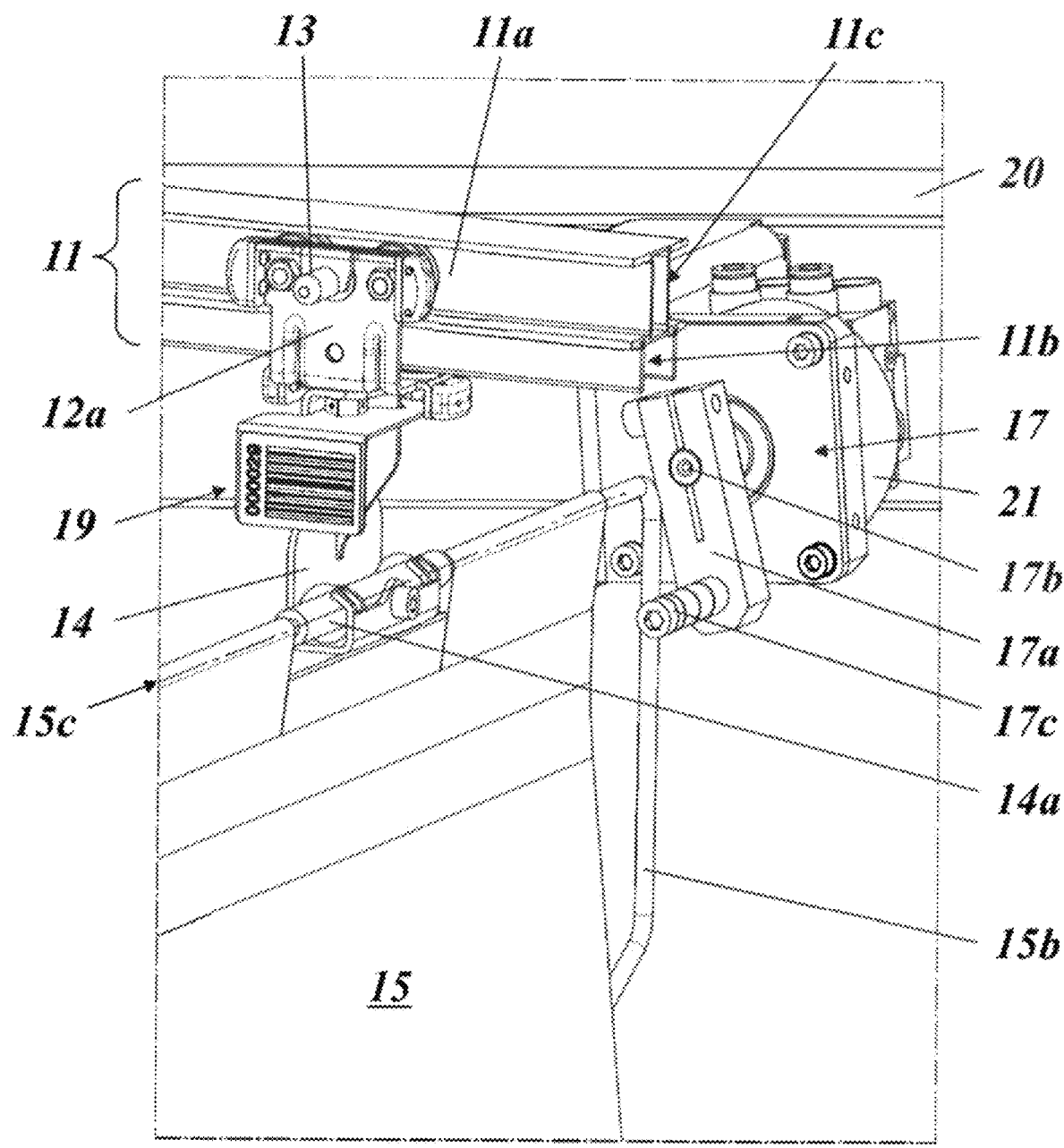
FIG. 2 shows, in an enlarged detail from FIG. 1, the carriage with the transport pocket suspended thereon and the opening mechanism.
Figures 3A, 3B:
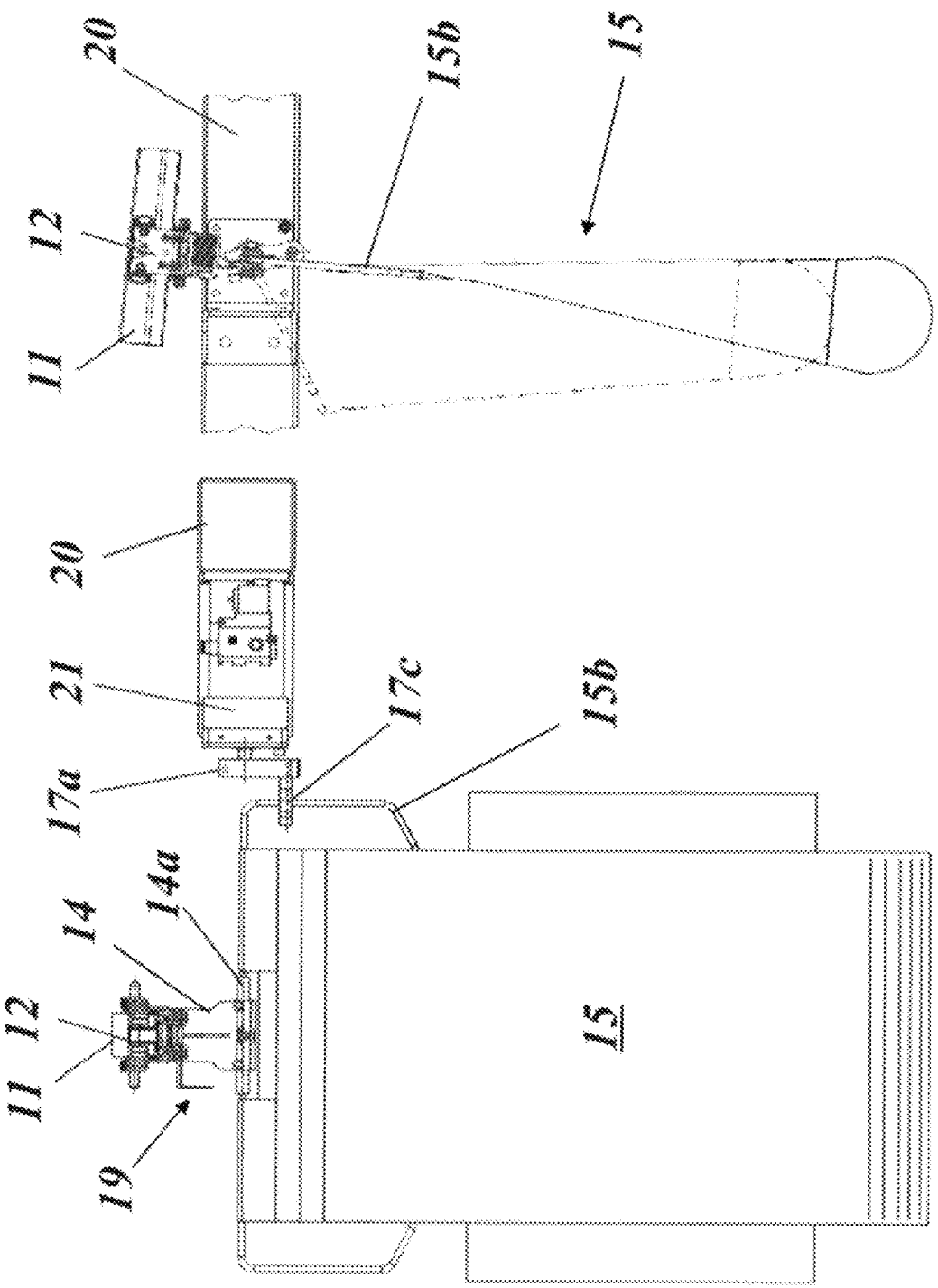
FIG. 3A shows, opposite to the conveying direction, the transport pocket ready to be opened in the region of the opening mechanism.
FIG. 3B shows, transverse to the conveying direction, the transport pocket ready to be opened in the region of the opening mechanism.

Pocket opening device 10 of FIG. 1 is mounted on a supporting structure 20, which is arranged beside actual running rail 11 for the transport. In the present example, supporting structure 20 is a rectangular tube; it can however readily be designed otherwise. Only a short section of running rail 11, which extends in a conveying direction, is shown in FIG. 1. As can be seen in the enlarged representation of FIG. 2, running rail 11 is constituted symmetrical with respect to a vertical central plane and comprises two opposite, U-shaped lateral channels 11a and 11c as well as a lower, also U-shaped central channel 11b, in which a carriage 12 with a plurality of wheels runs and is guided. Running channel 11 and carriage 12 can be constituted as is described and explained in publications WO 2016/030275 A1 and WO 2016/030274 A1.

Figure 5:
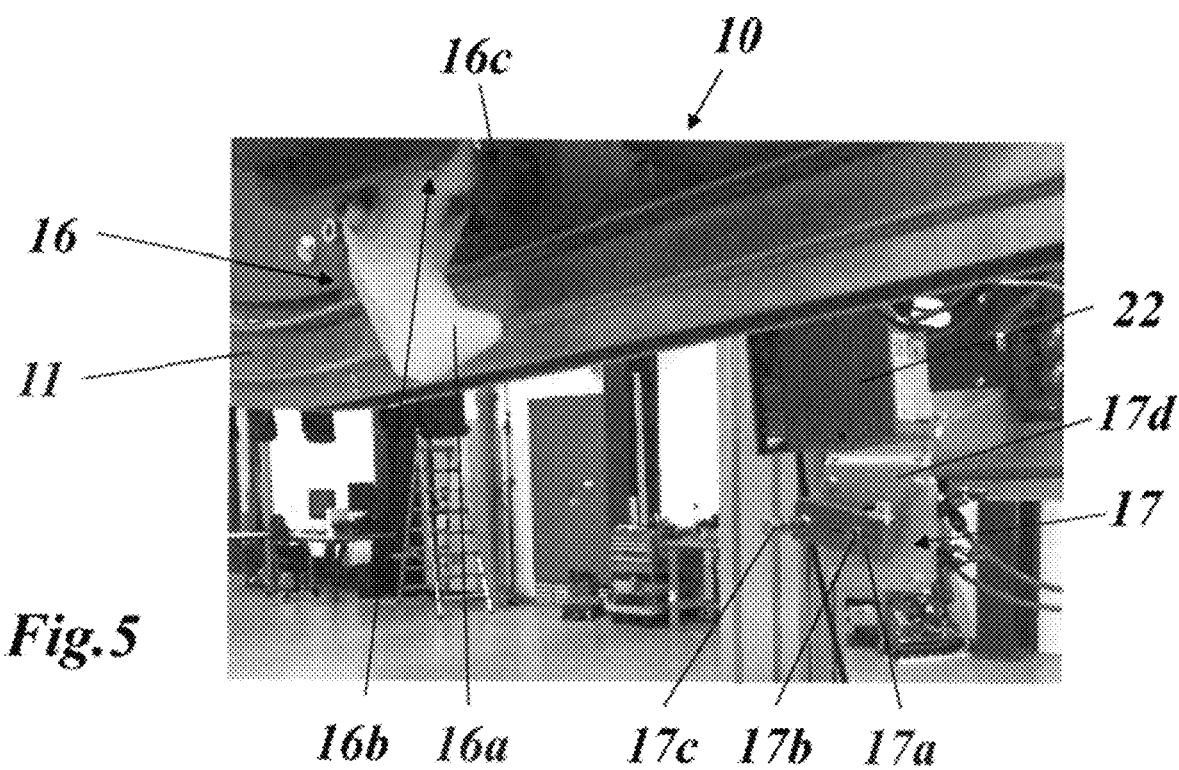
FIG. 5 shows a photographic overall view of the pocket opening device (without the transport pocket) with the lever mechanism arranged opposite the opening mechanism and responsible for stopping the transport pockets and conveying them onward.
Figure 6:
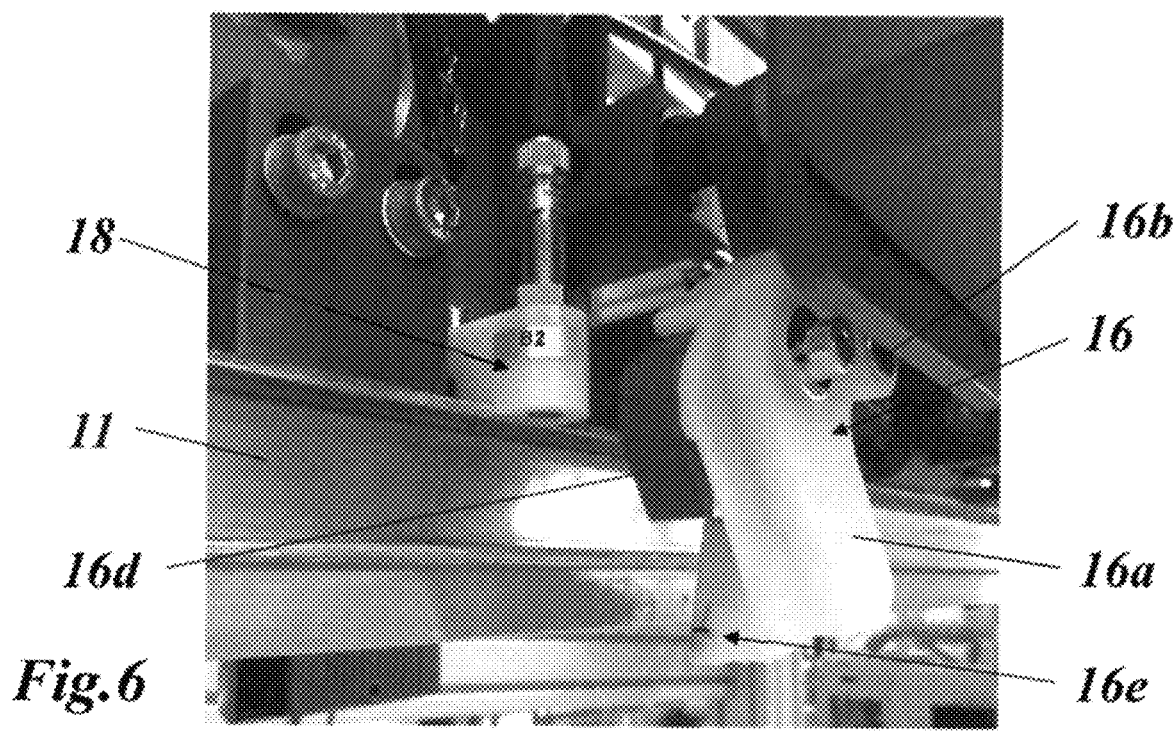
FIG. 6 shows a photographic detail view of the lever mechanism responsible for stopping the transport pockets and conveying them onward.

A laterally projecting, peg-shaped or bolt-shaped engagement element 13 is fitted above between two running wheels on U-shaped carriage body 12a of carriage 12, which engagement element will be dealt with below also in connection with a lever mechanism 16 responsible for stopping carriage 12 and conveying it onward (FIGS. 5 and 6). A carrying element 14 is fixedly attached to the underside of carriage body 12a, which is constituted as an angle bracket and at the lower end accommodates and fixes a tubular frame bearing 14a, which defines a swiveling axis 15c orientated transverse to conveying direction BR (single arrow in FIG. 1) for a swiveling frame 15b mounted in a swiveling manner in frame bearing 14a.

Swiveling frame 15b, which in the example of embodiment shown is constituted as a mechanically stable, essentially rectangular wire frame, is part of transport pocket 15, which hangs on carriage 12 fixedly and with a constant orientation (swiveling axis 15c transverse to conveying direction BR) by means of frame bearing 14a and carrying element 14.

Figure 4B:
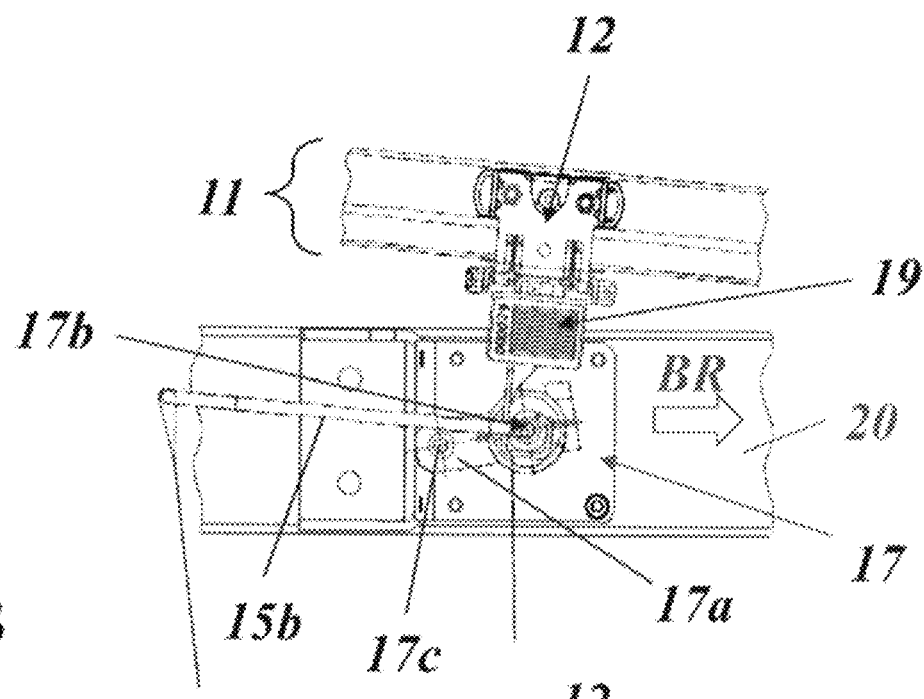
FIG. 4B shows the transport pocket directly after the opening.
Figure 4A:
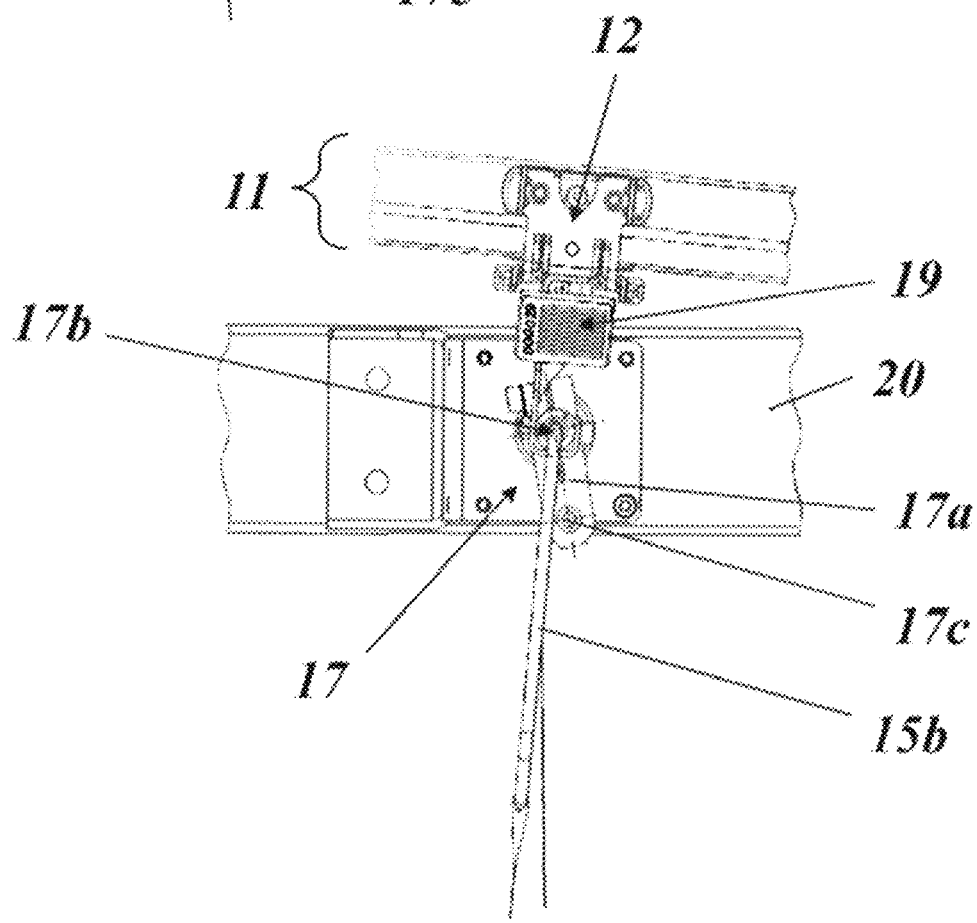
FIG. 4A shows the transport pocket directly before the opening.

Transport pocket 15 comprises a material web, for example made of a (reinforced or non-reinforced) fabric, a (laminated or non-laminated) film or another suitable material, said material web being fastened with both ends to swiveling frame 15b thereby forming carrying loop 15a hanging downwards. The two ends of carrying loop 15a are arranged one behind the other in the conveying direction, so that the edges of carrying loop 15a are not connected to one another at the sides except for short deflection supports 15d mounted in the lower deflection region. Swiveling frame 15b, which is guided through pockets constituted at the ends of the material web, can be swiveled about swiveling axis 15c between a first position, in which transport pocket 15 is closed (continuous line in FIG. 1; FIG. 4A) and a second position, in which transport pocket 15 is open (dot-dash line in FIG. 1; FIG. 4B). In the closed position of swiveling frame 15b, transport pocket 15 is conveyed on running rail 11 in conveying direction BR. In the open position of swiveling frame 15b, carriage 12 with transport pocket 15 is stopped and opened transport pocket 15 can be loaded or unloaded from one or the other side in access direction ZR (double arrow in FIG. 1).

The shown transport or conveying system with running rail 11 and pocket opening device 10 arranged at a predetermined point of running rail 11I usually comprises a multiplicity of carriages 12 of similar type and associated transport pockets 15. In order to be able to unequivocally identify carriages 12 and transport pockets 15 suspended thereon and to monitor the latter on their conveying route, an information carrier 19 can be fixedly attached to carriage 12, said information carrier 19 containing, in particular, machine-readable, usually encoded information, which can be read out optically, magnetically or by radio (e.g. as RFID). In the shown example of FIG. 1-4, information carrier 19 comprises a barcode, which can be (optically) scanned and read out in the region of opening device 10 by a data exchange or reading device 22 arranged there (FIG. 5).

An opening mechanism 17 is provided for opening transport pocket 15 by the swiveling of swiveling frame 15b, said opening mechanism comprising a swiveling lever 17a which can be swiveled about a swiveling axis 17b orientated transverse to conveying direction BR, said swiveling lever being arranged at the edge of the movement path of swiveling frame 15b of a conveyed transport pocket 15. At its free end, swiveling lever 17a is provided with a catch 17c projecting parallel to swiveling axis 17b into the movement path of swiveling frame 15b, said catch being able to be engaged with swiveling frame 15b in order to swivel swiveling frame 15b on carriage 12 from the first into the second position and to hold the latter in the second position for the loading and/or unloading of conveyed goods to be transported (see in particular FIG. 4).

Swiveling lever 17a can be swiveled between a rest position (FIG. 4A) and an opening position (FIG. 4B), wherein catch 17c on swiveling lever 17a of opening mechanism 17 in the rest position is located in conveying direction BR in front of swiveling frame 15b of a stopped transport pocket 15 (FIG. 4A), and in the opening position occupies a position between the front wall and rear wall of transport pocket 15 (FIG. 4B). The swiveling range of swiveling lever 17a extends beneath swiveling axis 17b and amounts to 90° or more between the rest position and the opening position. The swiveling of swiveling lever 17a can be brought about by a rotary drive 21, which in the present case operates hydraulically or pneumatically.

Transport pocket 15 is again transferred into the closed position from the stationary opened position shown in FIG. 4B by being conveyed onward in conveying direction BR sliding with its swiveling frame 15b over catch 17c. This can take place passively by the fact that the retention means stopping carriage 12 (stopping element 16d in FIG. 6) are released and carriage 12 is set in motion under the effect of gravity on an inclined rail section. This can however also take place actively in that, in addition to and simultaneously with the release of the retention means, a movement impulse is actively imparted to carriage 12 (conveying lever 16a in FIGS. 5 and 6). As soon as swiveling frame 15b has been moved completely in conveying direction BR across catch 17c, it automatically swivels under the effect of gravity into the closed position shown in FIG. 4A, so that transport pocket 15 is then closed again. The sliding of swiveling frame 15b across catch 17c can be facilitated by the fact that an easily rotatable roller is mounted coaxially on catch 17c, on which roller the swiveling frame rolls away.

As has already been mentioned, the opening process shown in FIG. 4 takes place after carriage 12 with transport pocket 15 to be opened has been stopped at a predetermined position in the region of opening mechanism 17. This predetermined position is selected such that swiveling lever 17a with catch 17c can precisely occupy the position shown in FIG. 4A relative to swiveling frame 15b. The mechanical conditions are particularly favorable when swiveling axis 15c of the swiveling frame and swiveling axis 17b of the opening mechanism coincide.

In order that an approaching carriage 12 can occupy said predetermined (retention) position, a lever mechanism 16 is arranged on the side of running rail 11 lying opposite opening mechanism 17 according to FIGS. 5 and 6, said lever mechanism on the one hand stopping carriage 12 precisely and also releasing it again, and on the other hand imparting a movement impulse to carriage 12 subsequently released again, said carriage being set in motion in conveying direction BR in a targeted manner.

Lever mechanism 16 comprises two levers, i.e. a lever-shaped stopping element 16d and a conveying lever 16a, said levers being jointly swivelable about a common swiveling axis 16b. A swiveling mechanism 16c engages with larger conveying lever 16a, said swiveling mechanism preferably being operated pneumatically or hydraulically and bringing about the swiveling process of the two levers 16a and 16d. FIG. 6 shows stopping element 16d (together with conveying lever 16a) in the stopping position. In this position, a carriage 12 coming from the right with its engagement element 13 travels—without clashing with conveying lever 16a—against stopping element 16d and stops at this point. Stopped carriage 12 can immediately be detected by carriage detector 18 arranged above running rail 11 and the detection signal can be relayed to a control (not shown), which then activates opening mechanism 17 and thus initiates the swiveling open of swiveling frame 15b by means of the opening mechanism.

When the loading and/or unloading process has been completed with opened transport pocket 15, the two levers 16a and 16d are rapidly swiveled upwards in the conveying direction. The effect of this is that, on the one hand, stopping element 16d releases the path for stopped carriage 12, and on the other hand conveying lever 16a swiveling upwards simultaneously engages with its cranked conveying element 16e formed at the free end with engagement element 13 on carriage 12 and thus imparts a movement impulse to carriage 12 in conveying direction BR (on the opposite side, the swiveling frame swiveled upwards slides in this phase across catch 17c of opening mechanism 17). Levers 16a and 16d then swivel back again into the initial position shown in FIG. 6 and are ready to stop a following carriage.

I claim:

1. A method for opening a transport pocket, which is moved in a conveying direction (BR) along a running rail extending in the conveying direction (BR) for the conveying of goods suspended on a carriage comprising the steps of:
   stopping forward movement of the carriage with the transport pocket (15) suspended thereon at a predetermined point of the running rail; and
   opening the transport pocket for loading and/or unloading of conveyed goods to be transported,
   wherein the loading and unloading of the conveyed goods to be transported takes place transverse to the conveying direction through lateral openings of the transport pocket.

2. The method according to claim 1, wherein the transport pocket of the carriage is opened for the loading and/or unloading of conveyed goods to be transported only when the carriage is already in a rest position.

3. The method according to claim 1, wherein the transport pocket of the carriage comprises a swiveling frame at the upper end, the swiveling frame being swiveled for the opening or closing of the transport pocket.

4. The method according to claim 1, wherein arrival of the carriage in a rest position is detected with a carriage detector, and that the carriage detector actuates an opening mechanism when it detects the carriage in the rest position.

5. The method according to claim 3, wherein the transport pocket comprises a material web fixed to the swiveling frame with both of two ends thereby forming a carrying loop hanging downwards, wherein the two ends of the carrying loop are arranged one behind another in the conveying direction, and the swiveling frame on the carriage can be swiveled about a first swiveling axis orientated transverse to the conveying direction between a first position, in which the transport pocket is closed, and a second position, in which the transport pocket is open, and that the swiveling frame on the carriage is swiveled by an opening mechanism from the first position into the second position and held in the second position for loading and/or unloading of conveyed goods to be transported.

6. The method according to claim 4, wherein the opening mechanism comprises a movable element for opening the transport pocket.

7. The method according to claim 6, wherein the movable element comprises a swiveling lever.

8. The method according to claim 5, wherein, after the loading and/or unloading, the carriage with the transport pocket suspended thereon is released at the predetermined point of the running rail, and that the swiveling frame swivels after the release about the first swiveling axis from the second position back into the first position.

9. The method according to claim 8, wherein the swiveling-back of the swiveling frame takes place automatically by gravity.

10. The method according to claim 8, wherein the transport pocket suspended on the carriage, after release, moves with its swiveling frame located in the second position past the opening mechanism, and that the swiveling frame swivels back from the second position into the first position only after passing the opening mechanism.

11. The method according to claim 8, wherein, after the release, a movement impulse in the conveying direction is imparted to the carriage with the transport pocket suspended thereon.

12. The method according to claim 11, wherein the movement impulse is imparted by a stationary, swivelable conveying lever (16a), which briefly engages with the carriage.

13. A pocket opening device for performing the method according to claim 1, comprising a first device for stopping a carriage, the first device being arranged in a region of the running rail and at least one opening mechanism for opening a transport pocket suspended on a stopped carriage such that the loading and unloading of the conveyed goods to be transported takes place transverse to the conveying direction through lateral openings of the transport pocket, said opening mechanism being arranged in the region of the running rail.

14. The pocket opening device according to claim 13, wherein the first device and the opening mechanism are connected to one another by control technology.

15. The pocket opening device according to claim 13, wherein the first device and the opening mechanism are arranged at a side of the running rail.

16. The pocket opening device according to claim 15, wherein the first device and the opening mechanism are arranged on opposite sides of the running rail.

17. The pocket opening device according to claim 15, wherein a pair of opening mechanisms of similar type are arranged on opposite sides of the running rail in a mirror-symmetrical manner.

18. The pocket opening device according to claim 13, wherein the first device comprises a mobile stopping element, which in a first position stops an approaching carriage at the predetermined point of the running rail and in a second position releases a carriage stopped there.

19. The pocket opening device according to claim 18, wherein the mobile stopping element is mounted in a swiveling manner about a first swiveling axis orientated transverse to the conveying direction and can be swiveled about the first swiveling axis between the first position and the second position.

20. The pocket opening device according to claim 19, wherein a conveying lever capable of being swiveled together with the stopping element about the first swiveling axis is assigned to the mobile stopping element, which conveying lever, upon release of a stopped carriage by the stopping element, simultaneously imparts to the carriage a movement impulse in the conveying direction.

21. The pocket opening device according to claim 13, further comprising a carriage detector arranged inside the first device at the predetermined point of the running rail, said carriage detector detecting a stopped carriage, and wherein the carriage detector is connected to the opening mechanism by control technology.

22. The pocket opening device according to claim 13, wherein the transport pocket comprises a material web fastened to a swiveling frame at both of two ends thereby forming a carrying loop hanging downwards and forming a front wall and a rear wall, wherein the two ends of the carrying loop are arranged one behind the other in the conveying direction, the swiveling frame on the carriage can be swiveled about a second swiveling axis orientated transverse to the conveying direction between a first position, in which the transport pocket is closed, and a second position, in which the transport pocket is open, and that the opening mechanism comprises a swiveling lever which can be swiveled about a third swiveling axis orientated transverse to the conveying direction, which swiveling lever is arranged at the edge of the movement path of the swiveling frame of a conveyed transport pocket and is provided at its free end with a catch, which can be engaged with the swiveling frame in order to swivel the swiveling frame on the carriage from the first into the second position and hold the latter in the second position for the loading and/or unloading of the conveyed goods to be transported.

23. The pocket opening device according to claim 22, wherein the swiveling lever can be swiveled between a rest position and an opening position, wherein the catch on the swiveling lever of the opening mechanism in the rest position is located in front of the swiveling frame of a stopped transport pocket, and in the opening position occupies a position between the front wall and rear wall of the transport pocket.

24. A pocket opening device for performing the method according to claim 1, comprising a first device for stopping a carriage, wherein the first device comprises a mobile stopping element, which in a first position stops an approaching carriage at the predetermined point of the running rail and in a second position releases a carriage stopped there, said first device being arranged in a region of the running rail and at least one opening mechanism for opening a transport pocket suspended on a stopped carriage, said opening mechanism being arranged in the region of the running rail, and wherein the mobile stopping element is mounted in a swiveling manner about a first swiveling axis orientated transverse to the conveying direction and can be swiveled about the first swiveling axis between the first position and the second position.

* * * * *